United States Patent
Jain et al.

(10) Patent No.: US 8,913,586 B2
(45) Date of Patent: Dec. 16, 2014

(54) GATEWAY ASSOCIATION

(75) Inventors: Puneet K. Jain, Hillsboro, OR (US); Muthaiah Venkatachalam, Beaverton, OR (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1041 days.

(21) Appl. No.: 12/633,515

(22) Filed: Dec. 8, 2009

(65) Prior Publication Data

US 2011/0002297 A1    Jan. 6, 2011

Related U.S. Application Data

(60) Provisional application No. 61/223,360, filed on Jul. 6, 2009.

(51) Int. Cl.
| | |
|---|---|
| *H04W 4/00* | (2009.01) |
| *H04W 48/00* | (2009.01) |
| *H04W 36/06* | (2009.01) |
| *H04L 12/66* | (2006.01) |
| *H04W 36/12* | (2009.01) |
| *H04W 88/16* | (2009.01) |
| *H04W 52/14* | (2009.01) |
| *H04W 52/10* | (2009.01) |
| *H04W 84/04* | (2009.01) |

(52) U.S. Cl.
CPC .............. *H04W 36/12* (2013.01); *H04W 48/17* (2013.01); *H04W 88/16* (2013.01); *H04W 52/146* (2013.01); *H04W 36/06* (2013.01); *H04W 52/10* (2013.01); *H04L 12/66* (2013.01); *H04W 84/045* (2013.01)
USPC ............................ 370/331; 455/438; 709/225

(58) Field of Classification Search
None
See application file for complete search history.

(56) References Cited

U.S. PATENT DOCUMENTS

| | | | |
|---|---|---|---|
| 2001/0055285 A1* | 12/2001 | Tomoike | 370/328 |
| 2006/0099950 A1 | 5/2006 | Klein et al. | |
| 2007/0192495 A1* | 8/2007 | Marais | 709/227 |
| 2007/0202871 A1 | 8/2007 | Altshuller et al. | |
| 2008/0192713 A1* | 8/2008 | Mighani et al. | 370/338 |
| 2008/0253342 A1* | 10/2008 | So et al. | 370/338 |
| 2008/0311911 A1* | 12/2008 | Koodli et al. | 455/436 |
| 2009/0252133 A1 | 10/2009 | Watanabe et al. | |
| 2010/0234025 A1* | 9/2010 | Julka | 455/436 |
| 2011/0051682 A1* | 3/2011 | Kampmann et al. | 370/331 |

FOREIGN PATENT DOCUMENTS

| | | |
|---|---|---|
| CN | 1798078 A | 7/2006 |
| JP | 20027238 | 1/2002 |
| JP | 2009-253678 A | 10/2009 |

(Continued)

OTHER PUBLICATIONS

International Search Report mailed Feb. 28, 2011, from PCT Application No. PCT/US2010/40883.

(Continued)

*Primary Examiner* — Khoa Huynh

(74) *Attorney, Agent, or Firm* — Schwabe, Williamson & Wyatt, P.C.

(57) ABSTRACT

Embodiments provide components of a communication network that may facilitate efficient optimization of the communication network. In various embodiments, network gateway selection for incoming subscriber stations may be allocated to one or more components that make intelligent allocation determinations. Additionally, in various embodiments, control of the communication network may also be allocated to various components.

17 Claims, 5 Drawing Sheets

(56) References Cited

FOREIGN PATENT DOCUMENTS

| WO | 0217670 A1 | 2/2002 |
| WO | WO2002-017670 A1 | 2/2002 |
| WO | WO2006-069531 A1 | 7/2006 |
| WO | 2008/001447 A1 | 1/2008 |
| WO | 2008139842 A1 | 11/2008 |
| WO | 2009037623 A2 | 3/2009 |

OTHER PUBLICATIONS

"IEEE Standard for Local and metropolitan area networks, Part 16: Air Interface for Broadband Wireless Access Systems," IEEE Computer Society and the IEEE Microwave Theory and Techniques Society, IEEE Std 802.16 2009, May 29, 2009, New York, New York.

International Preliminary Report on Patentability mailed Jan. 19, 2012 from International Application No. PCT/US2010/040883.

Office Action issued May 23, 2013 from Taiwanese Patent Application No. 099122011.

Preliminary Rejection for Korean Application No. 10-2012-7003084, mailed Jun. 24, 2013.

Office Action issued Aug. 27, 2013 from Japanese Patent Application No. 2012-519616.

Office Action issued on May 13, 2014 in Japanese Patent Application No. 2012-519616.

CN Office Action for CN Application No. 201080031223.4 issued Jan. 16, 2014.

* cited by examiner

GATEWAY ASSOCIATION

CROSS REFERENCE TO RELATED APPLICATIONS

The present application claims priority to U.S. Provisional Patent Application No. 61/223,360, filed Jul. 6, 2009, titled "Advanced Wireless Communication Systems and Techniques," the entire specification of which is hereby incorporated by reference except for those sections, if any, that are inconsistent with this specification.

TECHNICAL FIELD

Embodiments herein relate to the field of communication networks, and, more specifically, to network gateway selection and load distribution in broadband wireless access communication networks.

BACKGROUND

Broadband wireless networks include a continuum of coexisting, overlapping technologies that enable wireless high-speed communications. One technology, Worldwide Interoperability for Microwave Access (WiMAX), has been developed to provide long-range wireless networking capabilities. WiMAX may be a general name given to represent standards associated with the Institute for Electrical and Electronic Engineers (IEEE) 802.16 standards (e.g., IEEE 802.16-2009, approved May 13, 2009).

Typically, in WiMAX networks, a subscriber station will attach to a base station (BS) during initial network entry (INE). After attachment, the BS may select a default network gateway, such as an access service network gateway (ASN-GW), to serve the subscriber station. The default ASN-GW may be assigned based upon various criteria, for example, the manufacturer of the ASN-GW. The static assignment of an ASN-GW to a subscriber station may lead to inefficient deployment, use, and control of a network.

Additionally, when a subscriber station moves from a cell associated with one BS to another, the new BS may select another network gateway. This new network gateway may communicate with the originally selected network gateway, which acts as an anchor, to retrieve service flow, among other things. This intra-network gateway communication, or R4 signaling, relies on a hierarchical structure that may also diminish efficiency and bandwidth.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
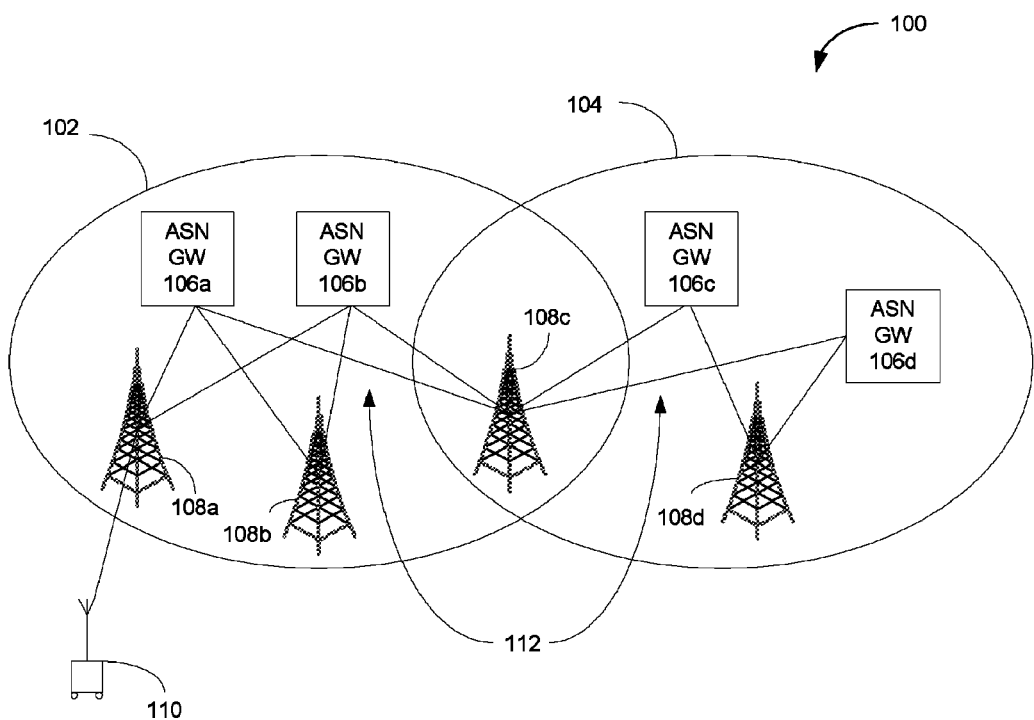
FIG. 1 illustrates a block diagram of a network in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent or that all described operations are necessary for the embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for efficient network gateway selection, load balancing, and data path optimization in communication networks are disclosed. In various embodiments, communications are disclosed which may enable creative network deployment, efficient network gateway load balancing, and overload control. The disclosure may reduce network design complexity and promote multi-vendor interoperability. In example embodiments, a computing system may be endowed with one or more components of the disclosed apparatuses and/or systems and may be employed to perform one or more methods as disclosed herein.

Embodiments herein enable dynamic selection and association of a network gateway with a subscriber station. In various embodiments, an access point, such as a base station, may communicate with one or more network gateways, such as an access service network gateway (ASN-GW) within an associated cluster. Based on the communication, the base station may determine and/or receive a selection of an appropriate network gateway to service the subscriber station. Determination of the appropriate network gateway may be through one or more optimizing algorithms that may be executed by a network gateway, or alternatively, by the base station. In various embodiments, the network gateway may be assigned to a subscriber station upon entry into a cell associated with the base station, upon the subscriber station leaving the cell, or upon a need for load balancing.

Embodiments herein may also enable data path optimization between one or more components of the communication network. For example, one possible data path may be generally described as a serving base station communicating with a serving network gateway that in turn communicates with an anchor network gateway. The anchor network gateway may have been assigned to the subscriber station by a previous serving base station, and the serving network gateway assigned by a current serving base station. Such a scenario may arise in the case of a handover. The communication link between the serving network gateway and the anchor network gateway may be a redundant communication link, and in various embodiments, may be obviated by having the current serving base station communicate directly with the anchor network gateway. This data path optimization may be triggered by the anchor network gateway, the serving network gateway, the serving base station, or various other components within the communication system as will be described in more detail herein. This interoperability may reduce the need for intra-network gateway communication.

Referring to FIG. 1, a block diagram of a communication network is illustrated, in accordance with various embodiments. The communication network 100 may be a WiMAX network, however, those of ordinary skill in the art will readily understand that the teachings of the disclosure may be applied to other communication networks as well. Communication network 100 may include clusters 102 and 104, network access points, for example base stations 108a-d, network gateways 106a-d, and a subscriber station 110. The communication network 100 may include other components in addition to those illustrated without deviating from the scope of this disclosure.

The communication network 100 includes clusters 102 and 104. While two clusters are illustrated, this disclosure may be applicable to a communication network with more or fewer clusters. A cluster, in accordance with various embodiments, may be one or more components, for example one or more network gateways, that belong to a domain of a particular deployment scenario. The cluster may be either an overlapping or non-overlapping cluster depending on a network configuration and may be based on a paging group, authentication domain, mobility domain, or other network characteristic. As illustrated, cluster 102 may include one or more network gateways 106a-b. Cluster 104 may include one or more network gateways 106c-d. Clusters 102 and 104 may include more or fewer network gateways without deviating from the scope of this disclosure. Additionally, in various embodiments, network gateways 106a-d may be ASN-GWs; however the disclosure is not to be limited in this manner.

In various embodiments, clusters 102 and 104 may also include one or more network access points, such as base stations 108a-d. The base stations 108a-d may be allocated to a particular cluster. For example, base stations 108a-b may be associated with cluster 102, base station 108d may be associated with cluster 104, and base station 108c may be associated with both clusters 102 and 104. In various embodiments, any base station 108a-d may communicate with any network gateway 106a-d within its cluster. In the illustrated embodiment, base stations 108a-b may communicate with network gateways 106a or 106b, base station 108d may communicate with network gateways 106c or 106d, and because base station 108c may be associated with both clusters, base station 108c may communicate with any of the network gateways 106a-d.

Communications 112, between base stations 108a-d and network gateways 106a-d may include R6 signaling. Other signaling, while not illustrated, may also be utilized within the communication network, without deviating from the scope of the disclosure. This may include, but is not limited to, R1 signaling between a subscriber station and a base station, R2 signaling between a subscriber station and a connectivity service network (CSN), R3 signaling between an access service network (ASN) and a CSN, R4 signaling between two network gateways, R5 signaling between two CSNs, R7 signaling between a data and control plane in a network gateway, and R8 signaling between two base stations. Other communications may be transmitted throughout the communication network 100 without deviating from the scope of the disclosure.

Referring back to FIG. 1, subscriber station 110 may communicate with base station 108a, for example, when the subscriber station 110 is within the cell range of base station 108a. In various embodiments, subscriber station 110 may be either a mobile subscriber station 110, such as a laptop computer, pda, nettop, netbook, smartphone, or other wireless device that is capable of movement in and out of various cell ranges. Alternatively, subscriber station 110 may be a stationary subscriber, such as a desktop computer or other communication device that remains predominantly in a fixed position. The disclosure is not to be limited in this manner.

The subscriber station 110 may communicate with base stations 108a-d using any communication protocol known in the art. For example, in one embodiment, subscriber station 110 may communicate with base station 108a utilizing orthogonal frequency division multiplexing (OFDM) and orthogonal frequency division multiple access (OFDMA). OFDM is a multi-carrier transmission technique that uses multiple frequencies to simultaneously transmit multiple signals in parallel. The signals may be processed so that they are orthogonal to each other such that there is no inter-carrier interference (IFI). In various embodiments, a subscriber station 110 may communicate with a base station 108a and a network gateway 106a to connect to an internet protocol (IP) network such as the Internet.

Figure 2:
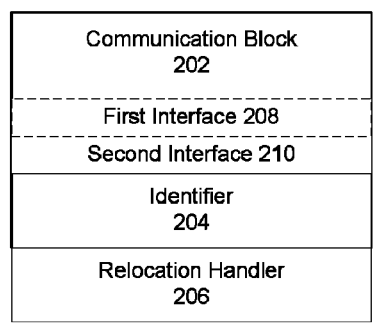
FIG. 2 illustrates a block diagram of an apparatus in accordance with various embodiments.

Referring now to FIG. 2, a block diagram of an apparatus is illustrated, in accordance with various embodiments. The apparatus may be included in a network gateway 106a-d, or alternatively, may be a separate device operatively and/or communicatively coupled to a network gateway 106a-d. The apparatus may include a communication block 202 having at least a first interface 208 and a second interface 210, an identifier 204, and a relocation handler 206. The apparatus 106 may include more or fewer components without deviating from the scope of the disclosure.

While the communication block 202 is shown with the first interface 208 and the second interface 210, the communication block 202 may include more or fewer interfaces without deviating from the scope of the disclosure. In various embodiments, the interfaces 208, 210 may be utilized to communicate with various components of the communications network 100. The interfaces 208, 210 may be interfaces configured to communicate via any of the signaling types mentioned above, for example R1-R8 signaling. Additionally, while illustrated as separate interfaces, interface 208 and interface 210, may alternatively, be a single interface capable of communication with various components of the network 100.

In various embodiments, the interface 208 may be an R6 interface configured to communicate with one or more base stations 108a-d within a cluster 102, 104. The R6 signaling may implement intra-ASN tunnels and be used for control plane signaling. Additionally, interface 210 may be an R4 interface and configured to communicate with one or more network gateways, for example network gateways 106a-d. R4 signaling may facilitate mobility of the subscriber station 110 across the various network gateways of the communication network 100.

In various embodiments, the communication block 202 may be configured to receive a network gateway selection request from an access point of a communication network cluster 102, 104 and load information from one or more network gateways of a plurality of network gateways of a communication network cluster. For example, the communication block 202 of network gateway 106a may receive a network gateway selection request from base station 108a via a first interface 208, and load information from network gateway 106b via a second interface 210.

Additionally, in various embodiments, the communication block 202 may be configured to transmit a network gateway selection response to an access point of the communication network cluster in response to the network gateway selection request. The network gateway selection response may include an indication of the network gateway to be used to service a subscriber station 110. Continuing with our above example, the communication block 202 of network gateway 106a may be configured to transmit the network gateway selection response to an access point such as base station 108a. The signaling between various components will be discussed further herein with reference to one or more signal diagrams.

In various embodiments, the apparatus of FIG. 2 may also include an identifier 204. The identifier 204 may be coupled to the communication block 202 and configured to identify a desired network gateway, e.g., network gateway 106a, from one or more network gateways 106a-b of a plurality of network gateways 106a-d based on load information. In one embodiment, the identifier 204 may identify network gateway 106a as the desired network gateway based on the network gateway 106a having a relatively small load as compared to other network gateways within the cluster 102. Identifying network gateway 106a as the desired network gateway in response to a network gateway selection request may prevent other network gateways of the cluster 102 from becoming overloaded and more evenly distribute broadband traffic across the communication network 100.

Still referring to FIG. 2, the apparatus may also include a relocation handler 206, in accordance with various embodiments. The relocation handler 206 may be coupled to the identifier 204 and configured to trigger a network gateway relocation. A network gateway relocation associates another network gateway, e.g., network gateway 106b, of the plurality of network gateways 106a-b, with the access point. The network gateway relocation may be triggered by one of the network gateways or access points determining that a new network gateway (not shown) has entered the communication network cluster, determining that a network gateway currently being used is overloaded, or receiving a relocation request from an access point, for example, a base station 108a-d. In various embodiments the relocation handler 206 may ensure proper allocation of network resources after the initial network entry of a subscriber station 110.

In various embodiments, access points such as base stations 108a-d may also include generally similar components to that of apparatus 106. For example, a base station 108a may include a communications block having one or more interfaces to communicate with other components of a communication network 100, an identifier configured to identify one or more network gateways 106a-b from a plurality of network gateways to serve the subscriber station 110, and a relocation handler. The base station 108a-d may utilize one or more optimizing algorithms to determine an efficient network gateway distribution for various subscriber stations 110.

Referring to FIGS. 3-8, signaling diagrams are illustrated, in accordance with various embodiments. The signal diagrams illustrate various signals transmitted between components of a communications network, such as the communication network 100 illustrated in FIG. 1. The signals may facilitate efficient network gateway selection, load balancing, and relocation of various resources and may be expressed in terms of a method or process, for example, a subscriber station transmitting a signal. In various embodiments, the underlying method or process may be implemented as machine-accessible instructions utilizing any of many different programming codes stored on any combination of machine accessible media such as a volatile or nonvolatile memory or other mass storage device. For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Figure 3:
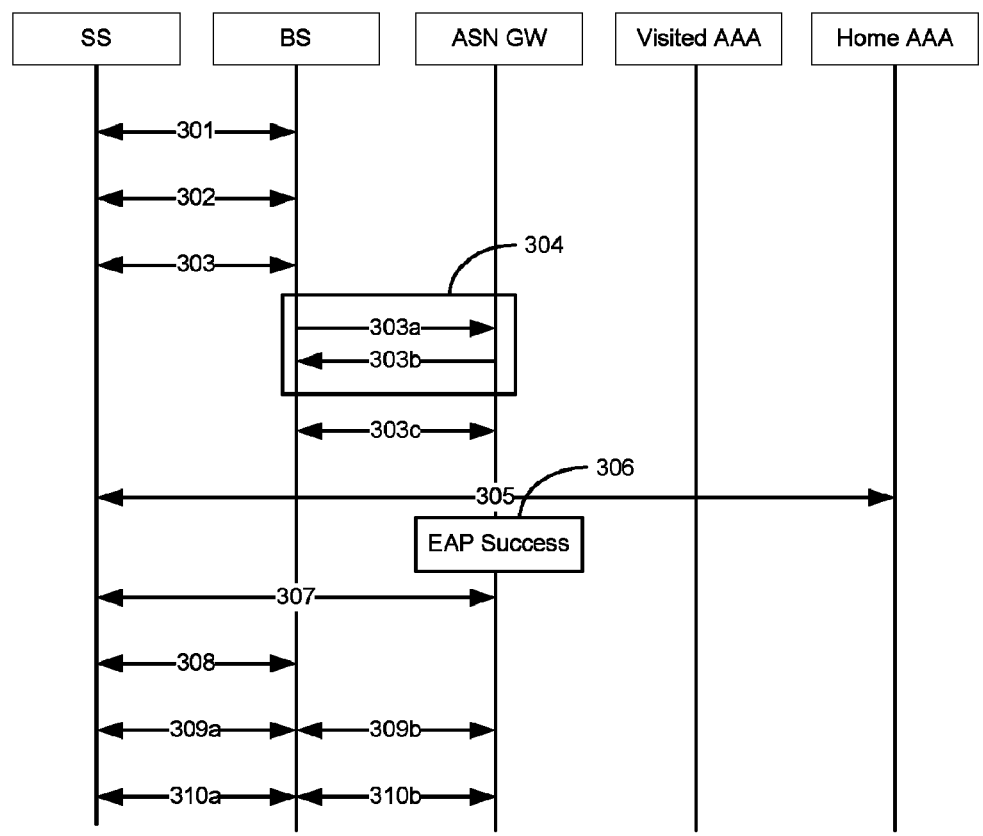
FIG. 3 illustrates a signaling diagram in accordance with various embodiments.

Referring to FIG. 3, a signaling diagram is illustrated, in accordance with various embodiments. The signaling diagram illustrates various communications between the components of communication network, for example communication network 100. In various embodiments, FIG. 3 may illustrate network gateway selection for the subscriber station upon initial network entry, for example, when the subscriber station does initial network entry to a WiMAX network. During such an entry, the subscriber station may attach to an access point, such as a base station 108a. In various embodiments, the base station 108a may then select a network gateway, such as network gateway 106a.

In various embodiments, the subscriber station may perform initial communication 301, 302 with a base station. In various embodiments, initial communication 301, 302 may include downlink channel acquisition, Media Access Control (MAC) synchronization, obtaining uplink channel parameters, performing initial ranging and/or physical (PHY) layer adjustments. Other communication may also be included without deviating from the scope of the disclosure.

At communication 303, the subscriber station may transmit a subscriber station basic capability request (SBC-REQ) message to a base station to negotiate a basic capability of the subscriber station. The communication 303, which may be a MAC message, may include information on a modulation and coding scheme supported by the subscriber station. Upon receiving the SBC-REQ message from the subscriber station, the base station may transmit a subscriber station basic capability response (SBC-RSP) message, also indicated as 303, to the subscriber station. The SBC-RSP 303 may be transmitted by the base station after checking the modulation and coding scheme supported by the subscriber station.

In various embodiments, the base station may communicate with a network gateway, such as ASN-GW. The communications 304 may include a network gateway selection request 303a and a network gateway selection response 303b. These communications 304 may enable efficient network gateway selection. For example, a base station 108a that is associated with subscriber station 110 may transmit a network gateway selection request 303a to a network gateway 106a of a plurality of network gateways 106a-b within cluster 102. The network gateway selection request 303a may include a request to select one network gateway, either 106a or 106b, from the plurality of network gateways 106a-b within cluster 102 to serve subscriber station 110. In one embodiment, the network gateway selection request 303a may be transmitted to a default network gateway of the plurality of network gateways. The default network gateway may be identified by its internet (IP) address. Alternatively, the network gateway selection request 303a may be transmitted to a virtual internet protocol (IP) address of the plurality of network gateways 106a-b. In various embodiments, the virtual IP address may be mapped to a master network gateway of the plurality of network gateways 106a-b.

In response to the network gateway request 303a, the base station may receive a network gateway selection response 303b. The network gateway selection response 303b may include information associated with at least one network gateway of the plurality of network gateways within a cluster that is to serve the subscriber station 110.

For example, in one embodiment, the base station 108a may include identifiers, for example IP addresses, of all network gateways 106a-b within a cluster 102. The base station 108a may transmit a network gateway selection request 303a to one of the plurality of network gateways 106a-b within the cluster 102. The one network gateway may be a default network gateway selected in one of more manners. In response, the base station 108a may receive a network gateway selection response 303b from the default network gateway 106a. The network gateway selection response 303b may include load information associated with the default network gateway 106a. In various embodiments, the network gateway selection response 303b may include load information for every network gateway 106b within the cluster 102. Based on this load information, the base station 108a may utilize an algorithm or other process to select the one network gateway of the plurality of network gateways 106a-b to serve the subscriber station 110.

In various embodiments, the base station 108a may also cache this load information, and update the cached load information based on receipt of other network gateway selection responses. This may enable the base station 108a to select another network gateway of the plurality of network gateways 106a-b for additional subscriber stations as they enter the base station's 108a cell area without further communication with the default network gateway or other network gateways 106a-b.

In another example embodiment, the base station 108a may transmit a network gateway selection request 303a to a virtual IP address of the plurality of network gateways 106a-b. The virtual IP address of the plurality of network gateways 106a-b may map to a master network gateway. Consequently, the base station may be unaware of which network gateway is acting as a master network gateway, and consequently, the master network gateway may periodically change without affecting the base station.

In response to transmitting the network gateway selection request 303a, the base station 108a may receive a network gateway selection response 303b from the master network gateway that includes an identification of the network gateway of the plurality of network gateways 106a-b that is to serve the subscriber station 110. The indication may be an internet protocol (IP) address of the network gateway. In this manner, the master network gateway may determine and select among the various network gateways 106a-b the most efficient network gateway to serve the subscriber station 110. In various embodiments, the master network gateway may receive information, such as load information, from the various network gateways 106a-b of the cluster 102 and utilize an optimizing algorithm to determine a network gateway selection.

Referring again to FIG. 3, following communications 304, context initialization of the subscriber station 110 may occur at 303c. After context initialization 303c, an extensible authentication protocol (EAP) may facilitate generation and exchange of various keys including a master session key (MSK) at 305, followed thereafter, by extensible authentication protocol (EAP) success at 306.

After EAP success at 306, the subscriber station 110 and the network gateway may generate and transmit 307 an authentication key. After exchange of the authentication key, the subscriber station 110 and the base station 108a may generate and transfer security association (SA) information, such as cryptographic suites and security information 308. The base station 108a may also generate and transmit a Transport Encryption Key (TEK) in order to facilitate data encryption. The TEK may be generated by the base station 108a randomly.

After generation and transfer of the SA and TEK at 308, the subscriber station 110 may perform IEEE 802.16e registration 309a with the base station 108a. Additionally, the base station 108a may register with the network gateway 309b. After registration, the subscriber station 110 may establish connection with the base station 108a via a dynamic service addition request (DSA-REQ), response, and acknowledgement 310a. Additionally, the base station 108a may establish a data path with the network gateway 106a via R6 signaling 310b. This signaling diagram is merely meant to serve as an illustration of one possible network gateway selection process. Those of ordinary skill in the art will understand that more or fewer signals may also be utilized without deviating from the scope of the disclosure.

Figure 4:
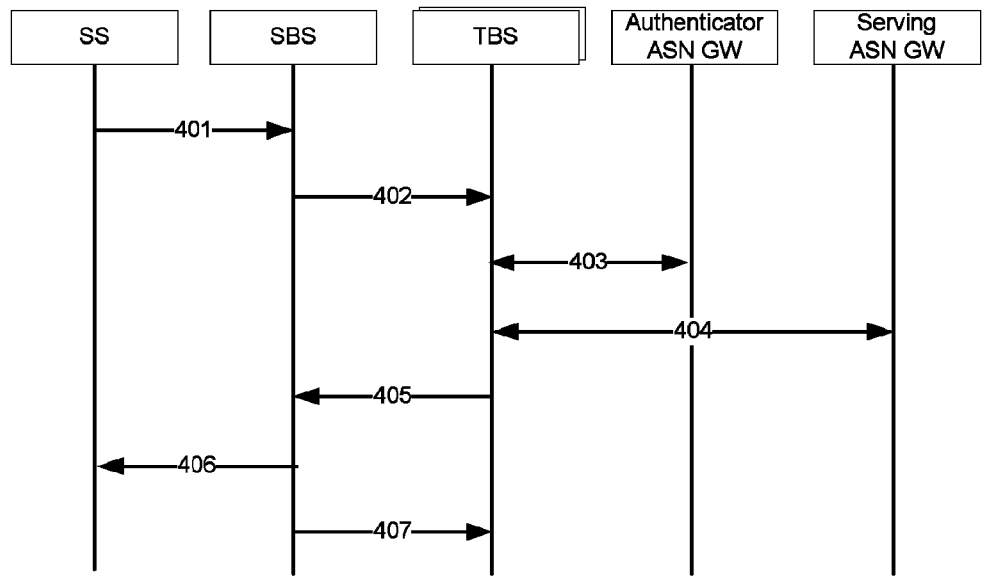
FIG. 4 illustrates a signaling diagram in accordance with various embodiments.
Figure 5:
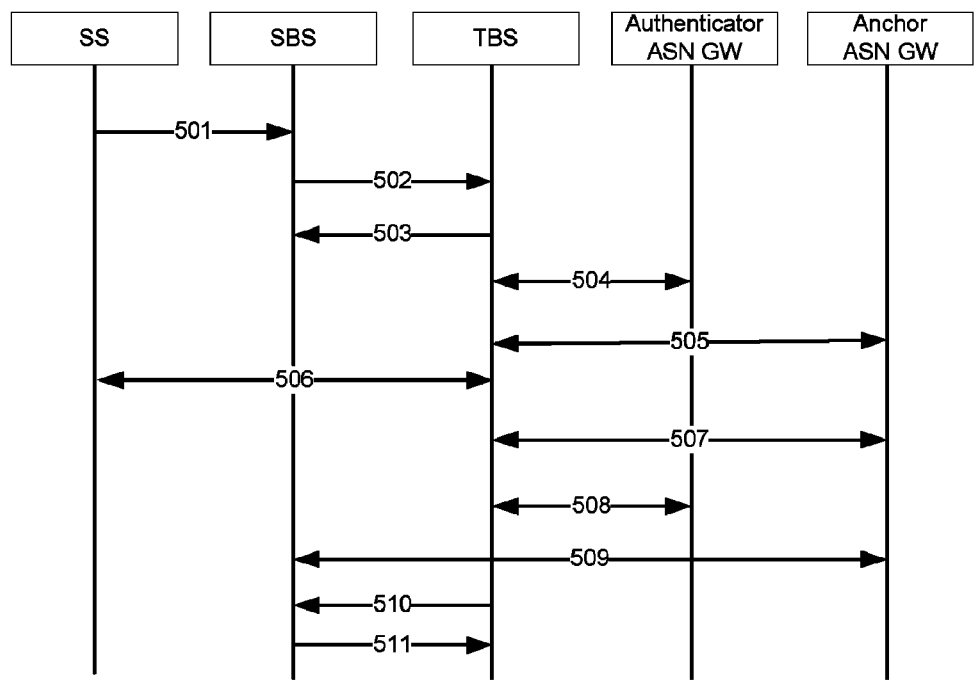
FIG. 5 illustrates a signaling diagram in accordance with various embodiments.

Referring now to FIGS. 4 and 5, a signaling diagram of base station relocation is illustrated, in accordance with various embodiments. The signaling of FIG. 4 may be associated with a handover preparation phase, and the signaling of FIG. 5 may be associated with a handover action phase.

Communication 401 may be transmitted from a subscriber station to a serving base station (SBS). In various embodiments, the serving base station may receive a handover request 401, such as a mobile station handover request (MOB-MSHO-REQ) message. In various embodiments, the handover request 401 may include information about one or more recommended neighbor base stations.

After receiving the mobile station handover request message 401, the serving base station may send a handoff request 402 that a target base station (TBS) may receive. In various embodiments, the handoff request 402 may be an R8 signal and may contain an identifier of the network gateway that is associated with the serving base station. The identified anchor network gateway may be one of a plurality of network gateways of a communication network cluster. In various embodiments, the handoff request 402 may also include an identifier of another network gateway, such as a network gateway that acts as an authenticator network gateway.

Upon receipt of the handoff request 402, the target base station may initiate context retrieval operation 403 with a network gateway such as an authenticator network gateway. In various embodiments, this communication 403 may instigate a context retrieval procedure from the authenticator network gateway. In this embodiment, the authenticator network gateway may then be required to communicate with the originally serving network gateway, which may be referred to as an anchor network gateway, to retrieve service flow context.

Alternatively, because an indication of the anchor network gateway was included in the handoff request 402 and the anchor network gateway is within the same cluster as the target base station, the target base station may communicate directly with the anchor network gateway. The identifier, in various embodiments, may be an IP address of the anchor network gateway, or any other identifier known in the art. After the target base station receives the handoff request 402 from the serving base station that includes an indication of the anchor network gateway, the target base station and the anchor network gateway may utilize R6 signaling for pre-registration and context retrieval 404.

In various embodiments, after the target base station retrieves the context from either the authenticator network gateway or the anchor network gateway, the target base station may transmit a handoff response 405 to the serving base station. In various embodiments, the handoff response 405 may be via R8 signaling. In response, the serving base station may send a mobile station handover response 406 to the subscriber station and a handoff acknowledgement 407 to the target base station.

Referring to FIG. 5, a signaling diagram of the base station relocation handover action phase is illustrated, in accordance with various embodiments. At communication 501, the subscriber station may transmit a mobile handoff indication (MOB_HO-IND) to a serving base station. In response to communication 501, the serving base station may transmit a handover confirmation (HO-CNF) 502 to the target base station. In various embodiments, the HO-CNF 502 may include an identifier or indication of the anchor network gateway and/or the authenticator network gateway, such as an IP address. HO-CNF 502 may be done through an R8 interface. In response, the target base station 108b may transmit a handover acknowledgement 503 to the serving base station 108a.

After the target base station acknowledges the handover by the handover acknowledgement 503, the target base station may perform a context retrieval procedure 504 with the authenticator network gateway if this was not performed during the handover preparation phase described previously with respect to FIG. 4. Alternatively, rather than utilizing the context retrieval procedure 504, the target base station may perform a data path pre-registration procedure 505 with the anchor network gateway, if this was also not previously performed during the handover preparation phase of FIG. 4.

After completion of communications 504 or 505, if they are needed, the subscriber station may perform ranging and network entry 506 with the target base station. The target base station may then perform registration and context retrieval 507 directly with the anchor network gateway 106a to register the target base station with the anchor network gateway.

In various embodiments, the target base station may signal the anchor network gateway via an R6 interface to perform the registration and context retrieval 507. After the registration and context retrieval 507, the target base station may perform a key update procedure 508 to update various keys. In various embodiments, the target base station may update keys with both the authenticator network gateway and the anchor network gateway. Additionally, the anchor network gateway and the serving base station may de-register from each other 509. The handover process may be complete when the target base station transmits a handover complete (HO-Complete) message 510 to the serving base station 108a and receives an acknowledgment 511.

Handoff signal diagrams of FIGS. 4 and 5 are, again, not meant to be limiting. Those of ordinary skill in the art will understand that more or fewer signals, or modifications of signals may be utilized without departing from the scope of the disclosure. As described, a serving base station may provide an IP address of an anchor network gateway to the target base station during subscriber station handover. If the target base station is in the same cluster as the serving base station, the target base station may either establish a direct communication link with the anchor network gateway, or alternatively, establish a data path with anchor network gateway via a serving network gateway. In this manner, the serving network gateway may act as a relay, such as an R4 data path.

Figure 6:
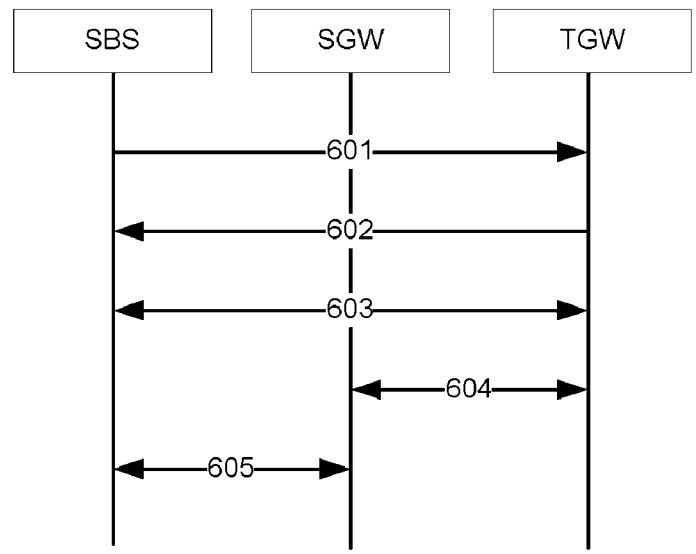
FIG. 6 illustrates a signaling diagram in accordance with various embodiments.
Figure 7:
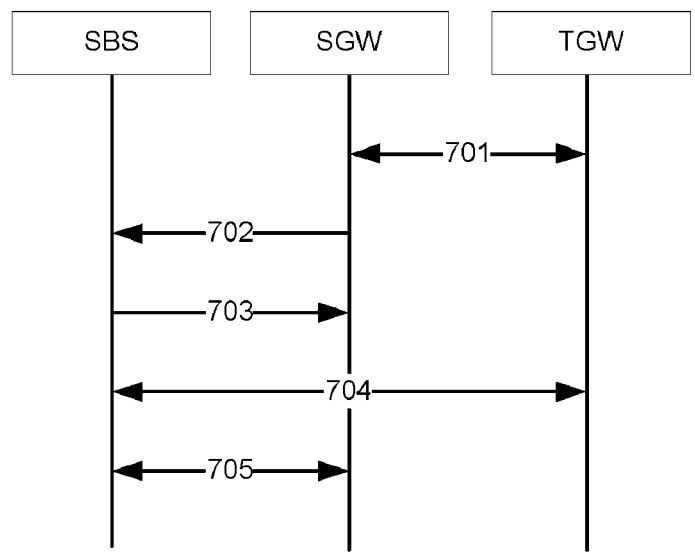
FIG. 7 illustrates a signaling diagram in accordance with various embodiments.

Referring to FIGS. 6 and 7, signal diagrams are illustrated, in accordance with various embodiments. The signal diagrams may illustrate various embodiments of network gateway relocation. Network gateway relocation may be triggered by either a base station or a network gateway, and may occur in response to various events including, but not limited to, a network gateway becoming overloaded, a subscriber station crossing a cluster boundary, an operator-initiated load-balancing, or a new network gateway entering the network. Network gateway relocation may, in various embodiments, facilitate a more efficient network as there is no longer a need for a new network gateway to constantly communicate with the serving network gateway via an R4 tunnel. The relocation of context to a target base station may enable the subscriber station to cease communication with an overloaded or inefficient network gateway.

With reference to FIG. 6, an embodiment of a base station triggered network gateway relocation is illustrated. The signaling diagram illustrates various signals transmitted and received among a serving base station, e.g., base station, a source network gateway, e.g., network gateway, and a target network gateway, e.g., network gateway. Other components may also participate in the relocation; however, for the sake of clarity, they have not been included.

The network gateway relocation may begin by a base station that is currently serving a subscriber station transmitting a network gateway selection request 601 to the source network gateway of a plurality of network gateways within a cluster. The network gateway selection request 601 may include a request for a new network gateway, e.g., the target network gateway, to succeed the currently used network gateway. In various embodiments, the network gateway selection request 601 may be transmitted to the target network gateway of the plurality of network gateways based at least on a network condition. For example, a base station may determine the target network gateway utilizing an algorithm and load information previously received from a network gateway. In various embodiments, the load information may have been recently updated at the base station.

After receiving the network gateway selection request 601, the target network gateway may respond with a network gateway selection response 602. In various embodiments, the network gateway selection response 602 may include an identifier of a target network gateway of the plurality of network gateways that is to succeed in serving the subscriber station.

After receipt of the network gateway selection response 602, the serving base station and the target network gateway may exchange communications 603 via an R6 interface for registration purposes. After registration, the serving network gateway may engage in a context transfer exchange 604 with the target network gateway to transfer a context to the target network gateway, and the serving base station may engage in deregister communications 605 with the serving network gateway to deregister with the serving network gateway.

Referring now to FIG. 7, an embodiment of a network gateway triggered (NGT) network gateway relocation is illustrated. In various embodiments, the network gateway may be a master network gateway for a cluster. The master network gateway may periodically receive load information from the various network gateways within the cluster and utilize one or more algorithms to determine if a network gateway relocation is warranted.

The NGT network gateway relocation may begin by a serving network gateway engaging a target network gateway in a context transfer 701 to transfer a context to the target network gateway. After the context transfer 701, the serving network gateway may transmit a network gateway update command 702 to the serving base station. In various embodiments, the network gateway update command 702 may include an identifier of the target network gateway, for example an IP address of the target network gateway. After receiving the network gateway update command 702, the serving base station may transmit an acknowledgment 703 to the serving network gateway.

After transmission of the acknowledgement 703, the serving base station may perform register operation 704 with the target network gateway, and finally may perform de-register operation 705 with the serving network gateway. This may complete the network gateway triggered network gateway relocation.

Figure 8:
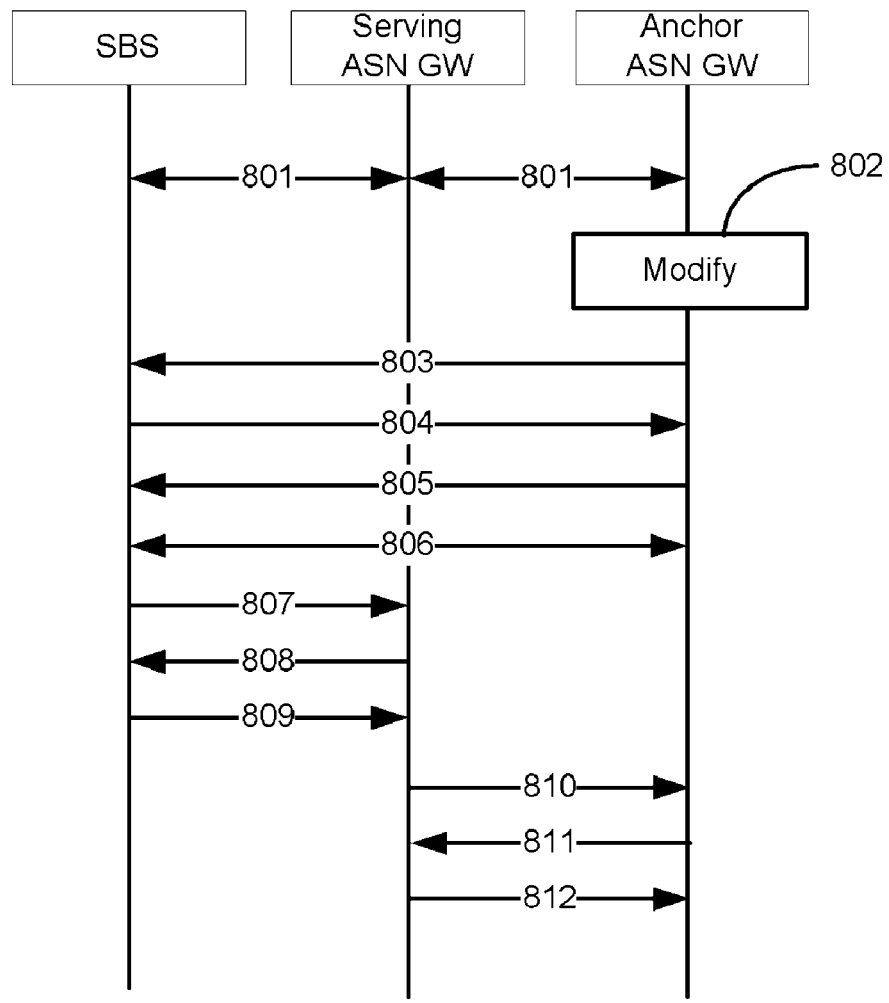
FIG. 8 illustrates another signaling diagram in accordance with various embodiments of the present disclosure.

Referring now to FIG. 8, an embodiment of a data path modification procedure is illustrated. Data path modification may be utilized to modify the data path between a subscriber station's anchor network gateway and the serving base station to improve (e.g., optimize) one or characteristics of the data path. This may, for example, remove a serving network gateway from the data path, thus establishing a direct data path between the anchor network gateway and the serving base station. In various embodiments, the data path modification procedure may be triggered by a serving base station, the anchor network gateway, or by serving network gateway.

In various embodiments, before the data path modification procedure is initiated, the data path 801 from the subscriber station's anchor network gateway to the serving base station is relayed to the serving network gateway. Due to the communication link between the serving network gateway and the anchor network gateway, the anchor network gateway may trigger a data path modification procedure 802. As discussed earlier, various other communication devices may also trigger the data path modification procedure.

After instigation of the data path modification procedure 802, the anchor network gateway may establish a direct data path 806 with the serving base station using data path registration transactions 803-805. In various embodiments, the transactions 803-805 may include data path registration requests, data path registration responses, and data path registration acknowledgments.

After establishment of a data path between the serving base station and the anchor network gateway, the serving base station may perform deregister operations 807-809 with serving network gateway to deregister its data path with serving network gateway. In various embodiments, deregister operations 807-809 may include transmission and/or receipt of path deregistration requests, path deregistration responses, and path deregistration acknowledgments. Subsequently or concurrently, the serving gateway may deregister 810-812 its data path with the anchor network gateway. In various embodiments, deregistering 810-812 may include path deregistration requests, path deregistration responses, and path deregistration acknowledgements. Upon completion of the optimization procedure, there is no longer a need for an R4 data path between the serving network gateway and the anchor network gateway.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising:
transmitting, by a base station associated with a subscriber station, a network gateway selection request to a network gateway of a plurality of network gateways within a cluster, wherein the network gateway selection request includes a request for one network gateway from the plurality of network gateways to serve the subscriber station; and
receiving, by the base station from the network gateway, a network gateway selection response that includes information associated with the one network gateway of the plurality of network gateways to serve the subscriber station, wherein the one network gateway is selected based upon one or more network conditions, wherein the network gateway selection response includes load information associated with one or more network gateways of the plurality of network gateways within the cluster.

2. The method of claim 1, wherein transmitting the network gateway selection request to the network gateway of the plurality of networks network gateways comprises transmitting the network gateway selection request to a default network gateway of the plurality of network gateways.

3. The method of claim 1, wherein transmitting the network gateway selection request to the network gateway of the plurality of network gateways comprises transmitting the network gateway selection request to a virtual internet protocol ("IP") address of the plurality of network gateways, wherein the virtual IP address is associated with a master network gateway.

4. The method of claim 1, further comprising:
selecting, by the base station, the one network gateway of the plurality of network gateways to serve the subscriber station based at least in part on the load information.

5. The method of claim 1, further comprising:
caching, by the base station, the load information; and
updating, by the base station, the cached load information in response to receipt of at least another network gateway selection response.

6. The method of claim 1, wherein the subscriber station is a first subscriber station and the method further comprises:
selecting, by the base station, another network gateway of the plurality of network gateways for a second subscriber station based at least in part on the received load information associated with the one or more network gateways.

7. The method of claim 1, further comprising:
transmitting, by the base station, a network gateway relocation request to a target network gateway of the plurality of network gateways based on a network condition update, wherein the target network gateway is different than the one network gateway of the plurality of network gateways and the target network gateway is to succeed the one network gateway in serving the subscriber station.

8. The method of claim 1, further comprising:

receiving, by the base station, from the one network gateway of the plurality of network gateways a network gateway update request based at least in part on a new network condition, wherein the network gateway update request includes an identifier of a target network gateway of the plurality of network gateways that is to succeed in serving the subscriber station.

9. The method of claim 1, wherein said transmitting and receiving comprise R6 signaling.

10. A network gateway, comprising:
a processor;
a memory coupled with the processor;
a communication block configured to receive a network gateway selection request from an access point of a communication network cluster and load information from one or more network gateways of a plurality of network gateways of the communication network cluster, wherein the access point is configured to provide a wireless connection to one or more wireless communication stations; and
an identifier coupled to the communication block and configured to identify a network gateway from the one or more network gateways of the plurality of network gateways based on the load information;
wherein the communications block is further configured to transmit a network gateway selection response to the access point of the communication network cluster in response to the network gateway selection request, wherein the network gateway selection response includes an indication of the network gateway and the load information.

11. The network gateway of claim 10, wherein the communication block is configured to receive the network gateway selection request via a first interface and the load information via a second interface.

12. The network gateway of claim 10, further comprising:
a relocation handler coupled to the identifier and configured to trigger a network gateway relocation, wherein the network gateway relocation associates another network gateway of the plurality of network gateways with the access point.

13. The network gateway of claim 12, wherein the relocation handler is configured to trigger the network gateway relocation in response to determining that another network gateway has entered the communication network cluster.

14. The network gateway of claim 12, wherein the relocation handler is configured to trigger the network gateway relocation in response to determining that the network gateway is overloaded.

15. The network gateway of claim 12, wherein the relocation handler is configured to trigger the network gateway relocation in response to the communication block receiving a relocation request from the access point.

16. A method comprising:
receiving, by a target base station from a serving base station, a handoff request that includes an internet protocol ("IP") address of a network gateway that is associated with the serving base station, wherein the network gateway is one of a plurality of network gateways of a communication network;
transmitting, by the target base station to the network gateway of the plurality of network gateways, a registration message to register the target base station with the network gateway in response to the handoff request;
transmitting, by the target base station, a network gateway selection request to another network gateway of the plurality of network gateways, wherein the network gateway selection request includes a request for a new network gateway of the plurality of network gateways to succeed the network gateway; and
receiving, by the target base station, a network gateway selection response, wherein the network gateway selection response includes load information for at least one network gateway of the plurality of network gateways.

17. The method of claim 16, wherein transmitting the registration message comprises transmitting the registration message via R6 signaling, and wherein the network gateway receives the registration message via the R6 signaling.

* * * * *